Patented Sept. 20, 1949

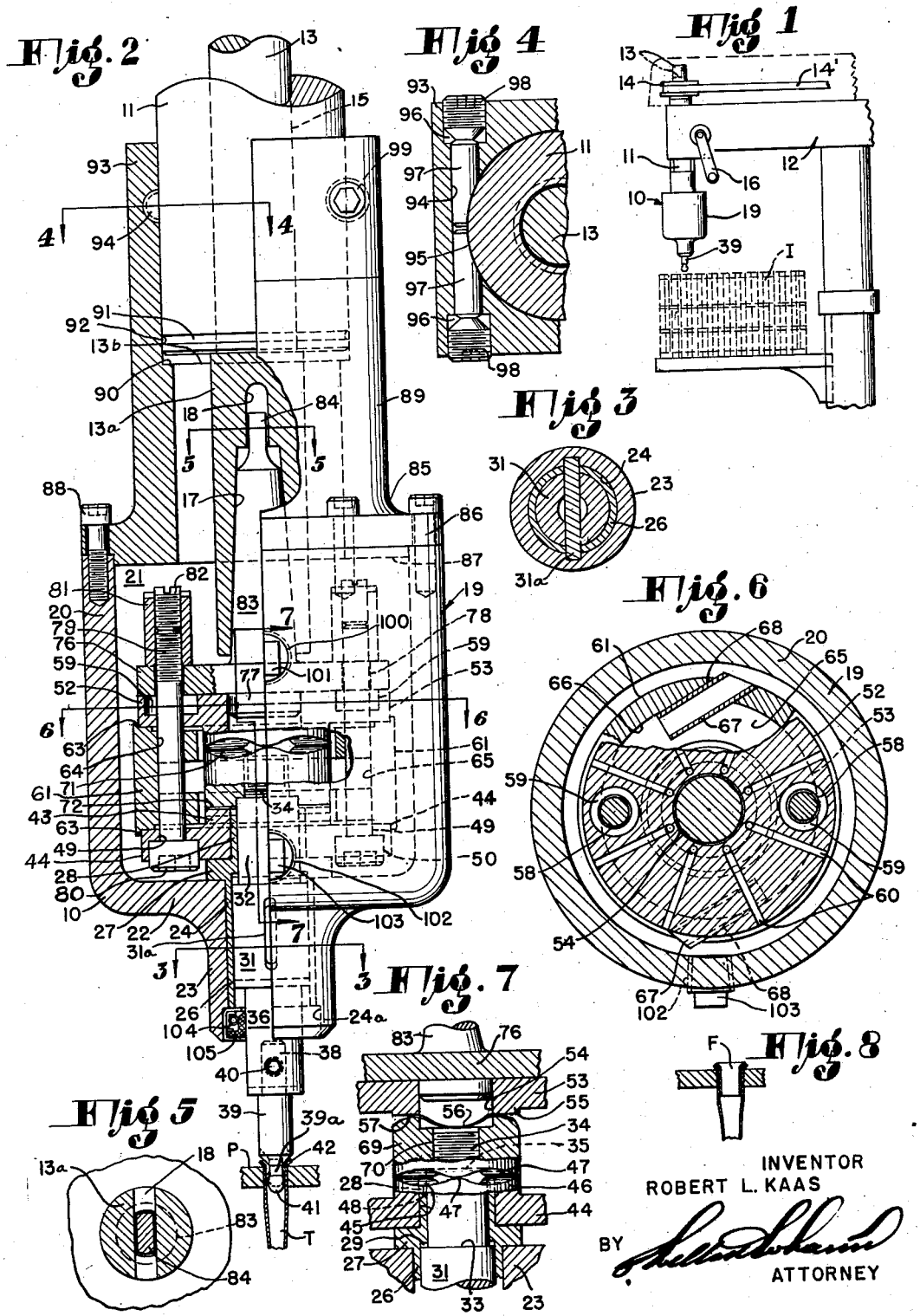

2,482,490

UNITED STATES PATENT OFFICE 2,482,490

SEALER TUBE MECHANISM WITH VIBRATING TOOL

Robert L. Kaas, Los Angeles, Calif., assignor to The Garrett Corporation, Airesearch Manufacturing Company division, Los Angeles, Calif., a corporation of California Application July 24, 1944, Serial No. 546,406

1 Claim. (Cl. 153—79)

This invention relates generally to the art of securing tubes to supporting plates or the like, and more particularly to improvements in securing the ends of hollow tubes in cooperating openings provided in end plates of an intercooler especially adapted for use on aircraft. Intercoolers are usually made up of great numbers of thin hollow metal tubes disposed in banks by end plates and intermediate plates having circular openings through which the tubes pass and in which the tubes are individually secured. Inasmuch as the tubes in an intercooler are subject to great stresses, both inside and outside the tube, by reason of their dual function of separating two independent flows of fluid in heat exchange relation under high velocity, it is important, therefore, that each tube be connected to its associated plate in a manner to effectively withstand these stresses and prevent vibrations.

At the presnet time, there are different ways in which the tubes are secured to the openings in the plates, such as the use of balls, but this method has the objection of enlarging the size of the tube. Another method resides in rotating a tool at the open end of the tube to flare out the tube or spin the end of the tube outwardly into engagement with the plate, but this has the further objection of thinning the wall of the tube at the point of connection, thus resulting in a relatively weak joint. It is, therefore, one of the objects of the present invention to provide a tool of special design capable of disposition in the open end of a tube and imparting movement which will produce a swedged end on the tube for effectively connecting the tube to the end plate without the objectionable results of the prior methods.

Another object of the present invention is to provide a tool of the character referred to which is adapted for mounting on the column of a drill press and utilization made of the rotation of its shaft to effect a reciprocation of the tool for swedging the end of the tube to the plate.

Another object of the present invention is to provide a tool of the character referred to embodied in a housing with provision for removable mounting on the column of a drill press without in any manner modifying the parts of or affecting its function as a drill press when the housing is removed.

Another object of the present invention is to provide a tool of the character referred to embodied in a housing and having cam means operatively associated with the rotatable shaft of a drill press and tool, respectively, the cam means being so arranged that rotation of the shaft is translated into reciprocation of the tool for swedging the end of the tube to the plate.

Another object of the present invention is to provide a tool of the character referred to embodied in a housing removably mounted on the column of a drill press and having means for connecting to the column in such a manner as to afford utilization of the manual control on the press for lowering and raising the column, thereby effecting a like movement of the housing for positioning the tool in and out of the operative engagement with the end of the tube.

A final object of the present invention is to provide a tool of the character referred to which is ample in construction, efficient in operation, and inexpensive to manufacture.

With the objects above indicated and other objects hereinafter explained in view, my invention consists in the construction and combination of elements hereinafter described and claimed.

Referring to the drawings:

Fig. 1 is a side fragmentary view of a drill press of standard construction and shows the improved tube sealing device embodying the invention suitably mounted thereon with an intercooler supported on the adjustable base of the press in operative relation.

Fig. 2 is an elevational view of the improved tube sealing device and has portions thereof in section to more clearly illustrate the details of the construction.

Fig. 3 is a transverse sectional view taken on the line 3—3 of Fig. 2 and shows the manner of connecting the tool to the housing to afford relative movement in an axial direction but prevent relative rotation.

Fig. 4 is a transverse fragmentary sectional view taken on the line 4—4 of Fig. 2 and shows the manner in which the tool housing is removably connected to the column of the drill press.

Fig. 5 is a transverse fragmentary sectional view taken on the line 5—5 of Fig. 2 and shows the manner in which the tool is provided with means having a portion shaped to be wedgingly disposed in the cooperating opening in the rotatable shaft on the drill press.

Fig. 6 is a transverse sectional view taken on the line 6—6 of Fig. 2 and shows the relative position of the tool housing and cam assembly, portions being broken away to show the manner in which the relatively movable parts are likewise lubricated.

Fig. 7 is a fragmentary vertical sectional view taken on the line 7—7 in Fig. 2 and shows the tool in its raised position, or opposite to that shown in Fig. 2.

Fig. 8 is a fragmentary vertical sectional view of a tube, ferrule, and end plate of an intercooler of modified form, and shows the end of the tube and ferrule after the swedging operation of the tool.

The tube sealing device is indicated generally by the numeral 10, and is adapted for removable mounting on the column 11 of a standard drill press 12. The drill press 12 is illustrated more or less diagrammatically, inasmuch as the outward designs vary considerably with the different manufacturers. They all include, however, a shaft 13 rotatably mounted in the upper head portion of the press and have a driving means usually in the form of a pulley 14 and belt 14' for effecting suitable rotation of the shaft. The column 11 is slidably and non-rotatably mounted in the customary manner in the upper head portion of the press and has a central opening 15 in which the adjacent portion of the shaft is rotatably disposed. The shaft 13 is connected in the usual manner to the column 11 of the drill press, so as to afford unitary movement in opposite axial directions without interfering with the shaft's rotation. To effect this unitary movement of the shaft and column, a manually operated lever 16 is pivotally mounted on the outside of the head portion of the drill press and generally actuates the cooperating pinion and rack assembly enclosed in the head portion. Adjustable stops are also provided to limit the unitary movement in both directions. The shaft 13 at its lower end 13a is of slightly larger diameter to provide an annular shoulder 13b for engagement with the lower inner face of the column 11 which may be utilized to limit the relative axial movement in one direction and a tapered opening 17 of standard Morse taper extends axially inward from its lower end for a substantial distance, the inner end of the opening 17 terminating in a slot 18 disposed transversely of the axis. This opening 17 is of universal application to adapt the end of the shaft 13 for quick insertion and removal of different sized drills having common tapers. The structure thus far described has no bearing on the present invention other than its embodiment thereon, and is common to many types of drill presses, one of which is shown diagrammatically for a clearer understanding of the present invention.

The tube sealing device 10 includes a housing 19, of metal, having an annular wall 20 disposed in a generally vertical position as more clearly shown in Figs. 1 and 3, and is open at its upper end 21 but closed at its lower end by a wall 22 which extends transversely across the bottom. A circular boss 23 projects centrally outward a suitable distance from the wall 22 and has a bore 24 extending axially inward through the boss and wall into the inside of the housing 19. A bushing of bronze or other suitable material, includes a lower tubular portion 26 which fits tightly against the wall of the bore 24 and extends outwardly to adjacent the end of the boss 23. The bushing is further formed with an annular flange 27 projecting laterally outward at the upper end of the tubular portion 26 and abuts the inner adjacent face of the wall 22 to hold the bushing in proper position. A similar tubular portion 28 projects axially upwardly from the upper side of the flange 27 but of slightly reduced diameter to provide an annular shoulder 29 and is shorter in length.

A cylindrical tool holder of drill rod material, has a mid-portion 31 of a diameter to readily slide within the lower tubular portion 26 of the bushing in which it is disposed, but is prevented from relative rotation by a key and slot connection 31a. The tool holder at its upper end is provided with a portion 32 of reduced diameter to slidably fit within the adjacent portion 28 of the bushing and provides a shoulder 33 which is adapted for abutment with the adjacent shoulder 29 to limit upward movement of the tool holder. The extreme upper end of the tool holder is formed with a portion 34 of reduced diameter, which projects beyond the upper tubular portion 28 to provide an annular shoulder 35 and is externally screwthreaded. The tool holder at its lower end is further formed with a portion 36, of reduced diameter and extends downwardly through the opening 24 in the boss and in spaced relation to the tubular portion 26. The portion 36 is provided with an opening which extends axially inward for a desired distance from its free end to removably receive the shank 38 of a swedging tool 39. The lower portion 36 of the tool holder is provided with a tapped opening disposed laterally to the shank 38 to receive a set screw 40 by which the tool is secured in operating position. The tool 39 has an annular tapered portion 42 for engagement with the end of a tube to effect swedging of the latter in a manner to be later described. From the lower end portion 42 depends a stem 39a of reduced diameter, said stem terminating in an enlarged generally spherical head 41 of such size as to fit into the adjacent end of a tube for properly centering or aligning the tube with respect to said annular tapered portion 42.

Any suitable means may be employed for translating the rotary movement of the shaft 13 to reciprocating movement of the tool 39, but a novel and simple construction is shown in the drawings. A lower cam member 43 has a circular base or flange 44 disposed horizontally above the housing wall 22 and has an axial opening 45 to rotatably receive the upper tubular portion 28 of the bushing on which it is mounted. A tubular extension 46 projects upwardly from the base and is disposed in encircling relation about the tubular portion 28, the top face of the extension 46 being formed with a cam surface in the form of crowns 47 and valleys 48. In the present instance there are four of the latter arranged alternately and spaced apart angularly about the axis. The cam valleys are 60° and the cam crowns 30° to their mating tangent lines. The base 44 is also provided with openings 49 on diametrically opposite sides which are counterbored at 50 on their under sides. The cam member 43 is further provided with a plurality of openings, not shown but referred to hereinafter, extending radially inward from its outer periphery to the cam face for lubrication of the latter.

An upper cam member 52 is similar to the lower cam member 43 and includes a circular base or flange 53 disposed horizontally above the base 44. The base 53 is formed with an axial opening 54 of the same diameter, in axial alignment with the opening 45. A tubular extension 55 projects downwardy a suitable distance from the base and its lower face is formed with a cam surface in the form of crowns 56 and valleys 57 arranged alternately and spaced apart angularly about the axis. The base 53 is also provided with openings 58 on directly opposite sides, which are counterbored at 59 on their upper sides. The base 53 is further provided with a pluarlity of openings 60 extending radially inward from its outer periphery to the cam faces for lubrication of the latter, the base 44 having similar openings. It will be noted that the cam members 43 and 52 are made identical so that they may be interchanged, thus simplifying manufacture and assembly.

A spacer sleeve 61, of metal or similar material, is disposed between the lower base 44 and the upper base 52 of the respective cam members. The tubular extensions 46 and 55 project freely into the opposite ends of the sleeve 61. The spacer 61 is counterbored slightly at 63 on its opposite end faces to receive and definitely position the adjacent portion of the bases 44 and 52, as more clearly shown in Fig. 2. The spacer 61 is likewise provided with openings 64 on diametrically opposite sides and adapted for axial alignment with respective openings in the bases of the cam members. The spacer is further formed with an annular groove 65 which extends radially outward to provide a peripheral wall portion 66 of reduced section, and tubular members 67 extend inwardly at an angle into the annular groove 65 through openings 68 provided in the peripheral wall on diametrically opposite sides, for purpose of lubrication, as more clearly shown in Fig. 6.

A reciprocable cam member 69, of circular shape, is disposed between the tubular extensions 46 and 55 of the cam members and has an axially extending opening 70 internally screwthreaded for secure but removable mounting on the threaded end 34 of the tool holder, the opening 70 being counterbored to provide a shoulder for abutment with the shoulder 35 on the tool holder for connecting the two members together for unitary reciprocation in a manner to be later explained. The cam member 69 has end faces 71 and 72 on opposite sides, which constitute cam surfaces in the form of crowns and valleys. In the present instance there are four of the latter engaged alternately and spaced apart angularly about the axis. The same number and arrangement are on both ends of the reciprocable cam member 69, but the corresponding cam contours must be directly opposite each other, as is more clearly shown in Fig. 7. The cam surface 71 of the reciprocable cam member cooperatively engages the cam surface of the lower rotatable cam member 43, while the cam surface 72 of the reciprocable cam member cooperatively engages the upper rotatable cam member 52 for a purpose to be later explained. While four crowns and valleys are here employed to obtain the desired relation between the R. P. M. of the shaft and the reciprocations of the tool per minute, which are about 4 to 1, for other conditions the number may vary without affecting the operation of the device in any manner.

An adapter member 76, of metal or similar material, rests upon the base 53. The adapter member 76 has a circular extension 77 which is disposed in the upper adjacent end of the opening 54 for suitably positioning the adapter and upper cam member. The adapter member 76 is further provided with openings 78 on diametrically opposite sides, which are positioned for axial alignment with the similarly spaced openings on the base 53. Bolts 79 have heads 80 positioned in the counterbores 50 and shanks extending upwardly through the aligned openings in the lower base 49, the spacer 66, the upper member 52, and the adapter base 76, the upper free ends being exteriorly screwthreaded to receive nuts 81 which, when turned home, draw all the cam elements into cooperating relation to afford unitary rotation. Studs 82 may be used for locking the nuts against accidental loosening. The adapter member 76 has an extension 83 on its outer side which projects axially upward therefrom for a suitable distance and terminates in a lateral tongue 84. The extension 83 is tapered upwardly in a complementary manner to the opening 17 in the rotatable shaft 13, in which it is forcibly inserted and the tongue 84 fits in the slot 18 to insure unitary rotation.

A cover member 85 has a circular flange 86 which is removably mounted on the end wall of the housing 19 and is formed with an annular centering extension 87 on its under side for snugly fitting the inner adjacent wall 20. The flange 86 and the adjacent end of the annular wall 20 are provided with aligned openings, those in the annular wall being screwthreaded to removably receive a plurality of machine screws 88 spaced apart angularly. The cover member 85 is further provided with a tubular extension 89 which projects axially upward and encircles the lower end 13a of the shaft 13. The inner peripheral wall of the extension 89 is of enlarged diameter at its upper end to removably receive the lower portion of the column 11 and the position of the column is determined by an annular shoulder 90 on the inner peripheral wall with which the end of the column abuts. At the lower end of the column 11, an annular groove 91 is formed, to receive a packing ring 92 to prevent the passage of oil thereby. The upper end of the tubular extension 89 is formed to square cross section as indicated by 93, to facilitate the embodiment of a simple means of attachment to the column 11. An opening 94 is drilled through the end 93 inwardly from its free end and extends from one face to the opposite, preferably parallel with the other end faces. The opening 94 is so disposed that its axis passes substantially at a tangent to the column 11, thus exposing an arcuate portion 95 of the latter, as more clearly shown in Figs. 2 and 4. The opening 94 is counterbored at 96 at its outer ends and internally screwthreaded. Pins 97 are removably disposed in the opposite ends of the opening 94 and their inner ends are out to conform with the adjacent arcuate portions 95 with which they engage. Threaded plugs 98 are removably inserted in the bores 96 and are employed to exert pressure on the pins 97 for securing the upper end of the cam member to the column 11. The arrangement is used on the opposite side of the column and the opening 99 is preferably positioned in parallel relation with the opening 94, as more clearly shown in Fig. 2. It is unnecessary to describe the other connection in detail again, other than to state it is so positioned that the load is divided therebetween.

It is desirable that the relatively movable parts of the tube sealing device be suitably lubricated and for this reason the housing 19 is filled with oil or similar lubricant. The annular wall 20 is provided with an opening 100 extending transversely therethrough, and near its upper end the opening is internally screwthreaded to receive a removable threaded plug 101 which can be removed when the lubricant is to be added. A similar opening 102 is provided in the annular wall 20 but is located adjacent the bottom wall 22 and is internally screwthreaded to receive a removable threaded plug 103 which is provided to afford removal of the oil in the housing or to check whether or not the oil is present. At the end of the boss 23, the opening 24 is formed with a counterbore 24a to receive an annular oil and fluid seal member 104 which has a flexible ring 105 in encircling engagement with the adjacent wall of the portion 36 on the tool holder in a manner to prevent the passage of lubricant thereby.

Due to the detailed description of the device only a brief explanation of its operation will follow. With the tube securing device 10 mounted on the column 11 of a drill press, operation of the press results in the rotation of its shaft 13. This in turn causes unitary rotation of the cam members 52 and 43 with their respective cam faces through their unit assembly. Inasmuch as the shaft 13 is held against longitudinally translative movement the cam members are confined to rotating movement in predetermined planes. The rotary movement of the cam members 52 and 43 on opposite sides of the reciprocable cam member 69 and their cooperating cam faces 71 and 72, effects reciprocation of the reciprocable cam member and its associated tool holder, by reason of the latter being secured against rotary movement by key and slot connection 31a. As the tool 39 is secured to the end of the tool holder, the tool is likewise reciprocated.

An intercooler I is supported on a base of the press below the device 10 and the device is lowered by operation of the hand lever 16. This downward movement continues until the head 41 of the tool 39 is positioned in the end of the tube T which is disposed in an opening in an end plate P more clearly shown in Fig. 2. Reciprocation of the tool 39 swedges the end of the tube by means of the tapered portion 42 into contact with the end plate. The same operation takes place when a ferrule F is used, as shown in Fig. 8.

The lowering movement of the device is limited so that the tool cannot be moved to such a position that it would damage the end of the tube during the swedging operation and the reciprocation of the tool is likewise limited so that the end of the tube is effectively connected to the end plate without materially changing the physical properties of the tube. The device is designed to swedge the end of one tube at a time, and must be elevated and lowered in the foregoing manner for each tube secured.

While I have described the preferred embodiment of the invention it is to be understood that I am not to be limited thereto inasmuch as changes and modifications may be resorted to without departing from the spirit of the invention as defined in the appended claim.

I claim as my invention:

In a device for securing the ends of thin-walled hollow tubes in openings provided therefor in end plates of heat exchangers, comprising: a tool having a shank and a shoulder adjacent one end thereof; a stem of reduced diameter extending axially from said shoulder and terminating in an enlarged generally spherical head, said head being of smaller diameter than the shank and adapted to fully enter the end of the thin-walled tube to be secured to said end plate; and mechanism for causing rapid longitudinal vibration of the tool to effect sealing of the tube end.

ROBERT L. KAAS

REFERENCES CITED

The following references are of record in the file of this patent:

UNITED STATES PATENTS

| Number | Name | Date |
|---|---|---|
| 687,408 | Scott et al. | Nov. 26, 1901 |
| 893,258 | Mills | July 14, 1908 |
| 1,048,683 | Gooch | Dec. 31, 1912 |
| 1,283,135 | Fortin | Oct. 29, 1918 |
| 1,494,109 | Griner | May 13, 1924 |
| 1,505,493 | Roberts | Aug. 19, 1924 |
| 1,753,677 | Andresen | Apr. 8, 1930 |
| 1,807,025 | Boyd | May 26, 1931 |
| 1,827,733 | Cornell | Oct. 20, 1931 |
| 1,866,529 | Farkas | July 12, 1932 |
| 1,924,946 | Kott | Aug. 29, 1933 |
| 1,948,409 | Weibull | Feb. 20, 1934 |
| 2,016,795 | Belknap | Oct. 8, 1935 |
| 2,088,131 | Cambeis | July 27, 1937 |
| 2,105,762 | Zimmerman | Jan. 18, 1938 |
| 2,169,697 | Kangas | Aug. 15, 1939 |
| 2,309,249 | Karp | Jan. 26, 1943 |
| 2,412,211 | Eichelman | Dec. 10, 1946 |

FOREIGN PATENTS

| Number | Country | Date |
|---|---|---|
| 462,666 | Great Britain | Mar. 9, 1937 |
| 489,248 | Great Britain | July 22, 1938 |

OTHER REFERENCES

The Iron Age, June 1943 Issue, pp. 48-51, pub. by Chilton Co., New York, New York.

Certificate of Correction

Patent No. 2,482,490                                                                 September 20, 1949

ROBERT L. KAAS

It is hereby certified that error appears in the printed specification of the above numbered patent requiring correction as follows:

Column 8, line 33, list of references cited, after "1,866,529   Farkas_____July 12, 1932" insert *1,924,383   Stampfli_____Aug. 29, 1933*;

and that the said Letters Patent should be read with this correction therein that the same may conform to the record of the case in the Patent Office.

Signed and sealed this 21st day of February, A. D. 1950.

[SEAL]

THOMAS F. MURPHY,
*Assistant Commissioner of Patents.*